WILLIAM FISHER.
Improvement in Show Stands.
No. 115,456. Patented May 30, 1871.
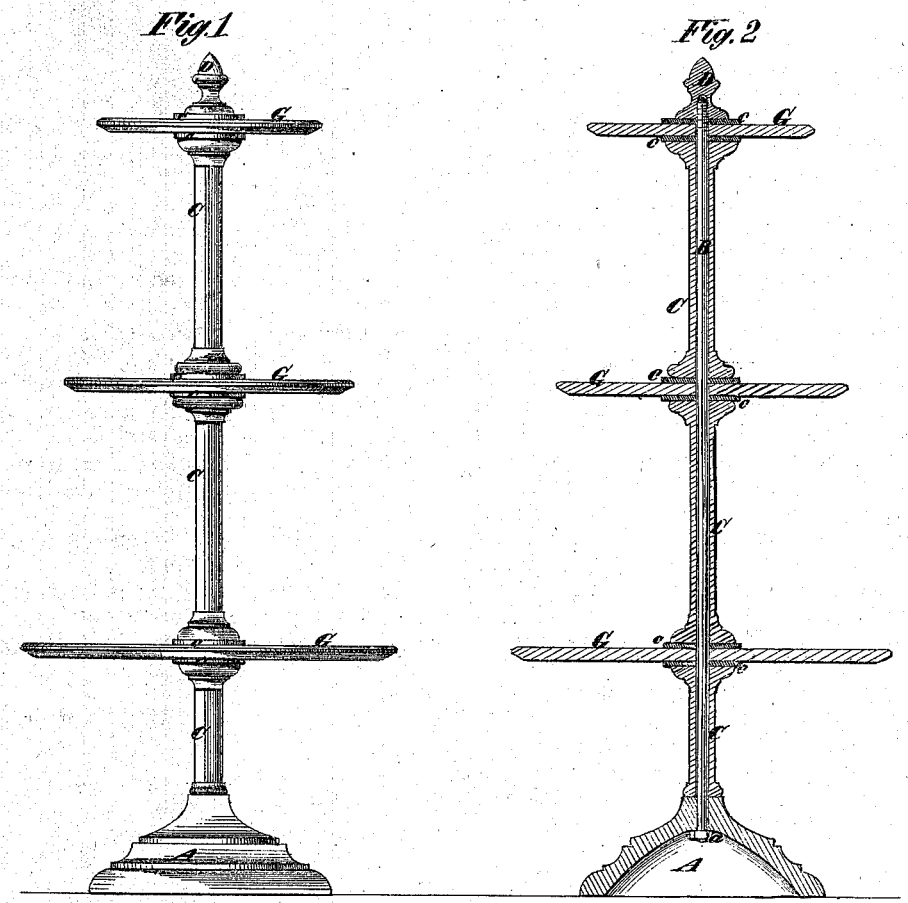

No. 115,456

UNITED STATES PATENT OFFICE.

WILLIAM FISHER, OF NEW YORK, N. Y.

IMPROVEMENT IN SHOW-STANDS.

Specification forming part of Letters Patent No. 115,456, dated May 30, 1871.

*To all whom it may concern:*

Be it known that I, WILLIAM FISHER, of the city, county, and State of New York, have invented a new and Improved Show-Stand; and I do hereby declare that the following is a full, clear, and exact description thereof, reference being had to the accompanying drawing forming a part of this specification.

This invention consists in the novel combination of a series of glass plates, shelves, or receptacles, arranged one above another, a metal base, one or more hollow columns of metal, a series of interposed washers of India rubber or other elastic material, and a screw-bolt passing through the said column, base, plates, shelves, or receptacles, the whole forming a stand for store or table use of cheap and durable construction, and which can be easily taken to pieces for moving from place to place.

In the accompanying drawing, Figure 1 is a side elevation of a stand made according to my invention; and Fig. 2 is a central vertical section of the same.

Similar letters of reference indicate corresponding parts in both the figures.

A is the base or foot of the stand, from the center of which there extends upwardly a rod or bolt, B, having a screw-thread on each end, and secured to the said base by a nut, a. C C C are hollow columns or supports, of cast-iron or other metal, which surround the rod, and each of which supports one of a series of glass plates, G G G, through holes in the centers of which the central rod B also passes. These columns have interposed between them rubber washers c c, and are all clamped together, so as to form one rigid structure, by a nut, D, which is secured on the upper end of the rod B.

A stand thus constructed is at once neat, cheap, and durable, and can easily be taken to pieces for packing by simply unscrewing the nut D and slipping the plates and their supporting-columns off the rod B.

Instead of the plates G G G, which simply form shelves, there may be substituted cup or dish like receptacles.

What I claim as my invention, and desire to secure by Letters Patent, is—

The combination of the glass plates, shelves, or receptacles G G G, metal columns C C C, interposed washers c c, and central screw-bolts and nuts, substantially as and for the purpose set forth.

WILLIAM FISHER.

Witnesses:
 FRED. HAYNES,
 R. E. RABEAU.